United States Patent
Jiang

(10) Patent No.: US 12,185,117 B2
(45) Date of Patent: Dec. 31, 2024

(54) UNLICENSED BAND INFORMATION TRANSMISSION METHOD, TERMINAL AND NETWORK DEVICE

(71) Applicant: VIVO MOBILE COMMUNICATION CO., LTD., Guangdong (CN)

(72) Inventor: Lei Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 580 days.

(21) Appl. No.: 17/348,025

(22) Filed: Jun. 15, 2021

(65) Prior Publication Data

US 2021/0314778 A1    Oct. 7, 2021

Related U.S. Application Data

(63) Continuation of application No. PCT/CN2019/122638, filed on Dec. 3, 2019.

(30) Foreign Application Priority Data

Dec. 21, 2018 (CN) .......................... 201811570532.3

(51) Int. Cl.
*H04W 16/14* (2009.01)
*H04W 56/00* (2009.01)
*H04W 72/04* (2023.01)

(52) U.S. Cl.
CPC ....... *H04W 16/14* (2013.01); *H04W 56/0045* (2013.01); *H04W 72/04* (2013.01)

(58) Field of Classification Search
CPC .................................................. H04W 16/14
See application file for complete search history.

(56) References Cited

U.S. PATENT DOCUMENTS

| | | | |
|---|---|---|---|
| 2006/0039491 A1* | 2/2006 | Han ................... | H04L 27/2666 370/210 |
| 2017/0164384 A1* | 6/2017 | Wang .................... | H04L 5/0092 |
| 2017/0223677 A1 | 8/2017 | Dinan et al. | |
| 2018/0007688 A1* | 1/2018 | Fu ..................... | H04W 72/0446 |
| 2018/0049244 A1 | 2/2018 | Lee | |
| 2018/0324861 A1* | 11/2018 | Oh ....................... | H04W 48/08 |

(Continued)

FOREIGN PATENT DOCUMENTS

| | | |
|---|---|---|
| CN | 105634669 A | 6/2016 |
| CN | 107079333 A | 8/2017 |

(Continued)

OTHER PUBLICATIONS

Supplementary European Search Report regarding Patent Application No. 19898767.9-1215/3902347; PCT/CN2019/122638, dated Jan. 19, 2022.

(Continued)

*Primary Examiner* — Guang W Li
(74) *Attorney, Agent, or Firm* — Harness, Dickey & Pierce, P.L.C.

(57) ABSTRACT

An unlicensed band information transmission method includes: receiving indication information; and obtaining an actual ending position of a transmission according to the indication information, wherein the actual ending position is located at an end position of a reference time domain symbol, or the actual end position is located inside the reference time domain symbol.

20 Claims, 4 Drawing Sheets

Receive indication information — 21

Obtain an actual transmission ending position according to the indication information, where the actual ending position is located at an ending position of a reference time-domain symbol, or the actual ending position is located inside the reference time-domain symbol — 22

(56) References Cited

U.S. PATENT DOCUMENTS

| | | | |
|---|---|---|---|
| 2019/0069312 A1* | 2/2019 | Oh | H04W 72/0446 |
| 2019/0319760 A1 | 10/2019 | Tang et al. | |
| 2020/0015094 A1* | 1/2020 | Noh | H04W 16/14 |
| 2020/0029319 A1 | 1/2020 | Huang et al. | |
| 2020/0169779 A1* | 5/2020 | Berner | H04N 21/4147 |
| 2021/0084605 A1* | 3/2021 | Wu | H04L 5/0094 |
| 2021/0297987 A1* | 9/2021 | Hwang | H04W 52/0235 |
| 2021/0330325 A1* | 10/2021 | Wilson | A61B 34/30 |

FOREIGN PATENT DOCUMENTS

| | | |
|---|---|---|
| CN | 108282288 A | 7/2018 |
| CN | 108633034 A | 10/2018 |
| EP | 3402286 A1 | 11/2018 |
| WO | WO-2018182264 A1 | 10/2018 |

OTHER PUBLICATIONS

International Search Report and Written Opinion of the International Searching Authority regarding International Patent Application No. PCT/CN2019/122638, dated Feb. 12, 2020. Translation provided by Bohui Intellectual Property.

"Discussion on usage of mini-slot in unlicensed band below 6GHZ," Huawei et al., 3GPP TSG RAN WG1 NR AdHoc Meeting R1-1700420, Jan. 20, 2017.

\* cited by examiner

Send indication information to a terminal, where the indication information is used to indicate an actual ending position of transmission, and the actual ending position is located at an ending position of a reference time-domain symbol, or the actual ending position is located inside the reference time-domain symbol — 71

UNLICENSED BAND INFORMATION TRANSMISSION METHOD, TERMINAL AND NETWORK DEVICE

CROSS-REFERENCE TO RELATED APPLICATIONS

This application is a Bypass Continuation Application of PCT/CN2019/122638 filed on Dec. 3, 2019, which claims priority to Chinese Patent Application No. 201811570532.3 filed on Dec. 21, 2018, which are incorporated herein by reference in their entirety.

TECHNICAL FIELD

The present disclosure relates to the field of communications technologies, and in particular, to an unlicensed band information transmission method, a terminal, and a network device.

BACKGROUND

In a mobile communications system, an unlicensed band may serve as a supplement to a licensed band to help a carrier perform service capacity expansion. To comply with the deployment of New Radio (NR) and maximize an NR-based unlicensed access, an unlicensed band may operate in frequency bands of 5 GHz, 37 GHz and 60 GHz. A large bandwidth (80 MHz or 100 MHz) in an unlicensed band can reduce the complexity of implementing a network device and a terminal.

SUMMARY

The embodiments of the present disclosure provide an unlicensed band information transmission method, a terminal, and a network device.

According to a first aspect, an embodiment of the present disclosure provides an unlicensed band information transmission method, applied to a terminal side and including:
  receiving indication information; and
    obtaining an actual ending position of transmission according to the indication information, where the actual ending position is located at an ending position of a reference time-domain symbol, or the actual ending position is located inside the reference time-domain symbol.

According to a second aspect, an embodiment of the present disclosure provides a terminal, including:
  a first receiving module, configured to receive indication information; and
  a determining module, configured to obtain an actual ending position of transmission according to the indication information, where the actual ending position is located at an ending position of a reference time-domain symbol, or the actual ending position is located inside the reference time-domain symbol.

According to a third aspect, an embodiment of the present disclosure provides a terminal, where the terminal includes a processor, a memory, and a program that is stored in the memory and executable on the processor, and steps of the foregoing unlicensed band information transmission method are implemented in a case that the program is executed by the processor.

According to a fourth aspect, an embodiment of the present disclosure provides an unlicensed band information transmission method, applied to a network device side and including:
  sending indication information to a terminal, where the indication information is used to indicate an actual ending position of transmission, and the actual ending position is located at an ending position of a reference time-domain symbol, or the actual ending position is located inside the reference time-domain symbol.

According to a fifth aspect, an embodiment of the present disclosure provides a network device, including:
  a first sending module, configured to send indication information to a terminal, where the indication information is used to indicate an actual ending position of transmission, and the actual ending position is located at an ending position of a reference time-domain symbol, or the actual ending position is located inside the reference time-domain symbol.

According to a sixth aspect, an embodiment of the present disclosure further provides a network device, where the network device includes a processor, a memory, and a program that is stored on the memory and executable on the processor, and steps of the foregoing unlicensed band information transmission method are implemented in a case that the program is executed by the processor.

According to a seventh aspect, an embodiment of the present disclosure provides a computer-readable storage medium, with a program stored thereon, where in a case that the program is executed by a processor, steps of the foregoing unlicensed band information transmission method are implemented.

DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive another drawing from these accompanying drawings.

DESCRIPTION OF EMBODIMENTS

Figure 1:
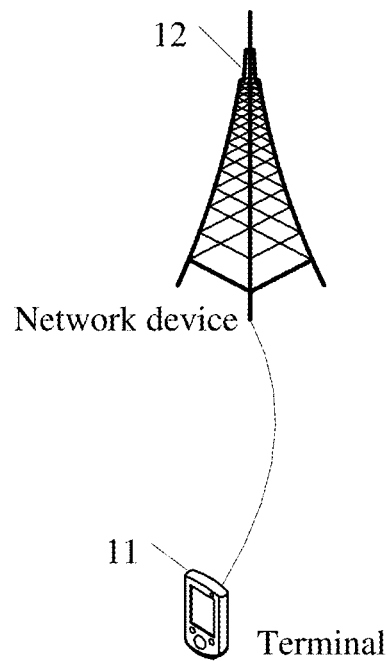
FIG. 1 illustrates a block diagram of a mobile communications system applicable to an embodiment of the present disclosure.

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. On the contrary, these embodiments are provided to enable a more thorough understanding of the present disclosure and to convey the scope of the present disclosure to those skilled in the art.

The terms "first", "second", and the like in this specification and claims of the present disclosure are used to distinguish between similar objects instead of describing a specific sequence or order. It should be understood that such used data is exchangeable in a proper case, so that the embodiments of the present disclosure described herein can be implemented in sequences other than those shown in the figures or described herein. Moreover, the terms "include", "contain" and any variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. "And/or" used in the specification and claims means at least one of the connected objects.

The technology described in this specification is not limited to the Long Term Evolution (LTE)/LTE-Advanced (LTE-A) system. It can also be applied in various wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) and other systems. The terms "system" and "network" are often used interchangeably. The technology described herein can be used in the above-mentioned systems and radio technologies as well as other systems and radio technologies. However, an NR system is described in the following description for illustrative purposes, and an NR terminology is used in most of the following description, although these technologies can also be applied to applications other than the NR system application.

The following description provides examples and does not limit the scope, applicability, or configuration set forth in the claims. The functions and arrangements of the elements under discussion may be changed without departing from the spirit and scope of the present disclosure. In various examples, various procedures or components may be omitted, replaced, or added appropriately. For example, the described method may be performed in an order different from that described, and steps may be added, omitted, or combined. In addition, features described with reference to some examples may be combined in other examples.

In general, the unlicensed band is shared by multiple radio access technologies (RATs), such as Wi-Fi, radar, and long term evolution-licensed assisted access (LTE-LAA). For that reason, the unlicensed band must comply with a preset regulation when it is used, to ensure that all devices can use the resource in a fair way, where the preset regulation includes: listen before talk (LBT) and maximum channel occupancy time (MCOT), and the like. When a transmission node needs to perform LBT before sending information, energy detection (ED) is conducted on a surrounding node. In case that detected power is lower than a threshold value, a channel is considered to be idle, and the transmission node can perform sending. Otherwise, the channel is considered to be busy and the transmission node cannot perform sending. The transmission node mentioned herein may be a network device (such as a base station), a terminal, a WiFi access point (AP), or the like. After the transmission node starts to transmit, the channel occupancy time (COT) cannot be greater than MCOT.

A category (Cat) of common LBT or channel access may be divided into Cat 1, Cat 2 and Cat 4. LBT of Cat 1 or a channel access mechanism of Cat 1 means that the transmission node skips conducting LBT, that is, no LBT or immediate transmission. LBT of Cat 2 is one shot LBT, that is, a node conducts LBT once before transmission. If a channel is idle, transmission will be conducted; and if a channel is busy, transmission won't be conducted. LBT of Cat 4 is a back-off-based channel listening mechanism. When listening that a channel is busy, a transmission node performs back-off and continues to conduct listening until an idle channel is listened. For a network device, LBT of Cat2 is applied to a discovery signal (DS) without carrying any physical downlink shared channel (PDSCH), LBT of Cat 4 is applied to a PDSCH/physical downlink control channel (PDCCH)/enhanced PDCCH (ePDCCH). For a terminal, LBT of Cat4 corresponds to a UL channel access procedure of type 1, and LBT of Cat 2 corresponds to a UL channel access procedure of type 2.

For example, on an unlicensed band, within channel occupancy time initiated by a network device, that is, the network device conducts LBT to obtain the COT, the terminal may conduct LBT of Category 1 in a case that a gap between an end of a downlink transmission and a start of an uplink transmission is less than 16 μs, and the terminal may conduct LBT of Cat2 in a case that a gap between two consecutive transmissions by the terminal within the COT is less than 25 μs, or in a case that there is no downlink transmission (DL transmission) following an uplink transmission (UL transmission). The two consecutive transmissions by the terminal may be scheduled or granted transmissions. In addition, within the COT initiated by the network device, if one downlink burst follows one uplink burst and a gap between an end of a scheduled UL transmission and a start of an uplink burst is less than 16 μs, LBT of Cat 1 may be conducted; and if the gap is greater than 16 μs but less than 25 μs, LBT of Cat2 may be conducted.

In eLAA, a network device uses 1 bit in downlink control information (DCI) to indicate a channel access type, that is, UL channel access procedure of type1 or type2. In NR, a network device will indicate a scheduled starting position and duration by using a time-domain resource allocation field in DCI. The starting position and duration determine a transmission ending position.

On an unlicensed band, time-domain granularity of LBT is at a level of microsecond (μs). For example, the foregoing gap that can use the LBT of Cat 1 is 16 μs at most. The granularity scheduled by a network device is one time-domain symbol (such as a OFDM symbol, OS for short), and a minimum granularity of every signal is one OS, so the solution in the prior art fails to match granularity of LBT. For example, in a case that LBT is LBT of Cat 2, the terminal conducts one-shot LBT and then starts transmission. For subcarrier spacing of 15 kHz and 30 kHz, a duration of one OS is greater than 25 μs. The case is similar to another subcarrier spacing, which corresponds to 2OS>25 μs, or multiple OSs. As a size of the OS is not a multiple of 25 μs or 16 μs, there is no guarantee that a gap between two transmissions/ending time of LBT is consistent with a starting position of a next transmission.

Referring to FIG. 1, FIG. 1 illustrates a block diagram of a wireless communications system applicable an embodiment of the present disclosure. The wireless communications system includes a terminal 11 and a network device 12. The terminal 11 may be referred to as terminal equipment or user equipment (UE) as well, and the terminal 11 may be a mobile phone, a tablet personal computer, a laptop computer, a personal digital assistant (PDA), a mobile Internet device (MID), a wearable device, on-board equipment or another terminal-side device. It should be noted that a specific type of the terminal 11 is not limited in the embodiments of the present disclosure. The network device 12 may be a base station or a core network, where the foregoing base station may be a base station of 5G and later releases (such as a gNB and a 5G NR NB), or a base station in another communications system (such as an eNB, a WLAN access point, or another access point), and the base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, or another appropriate term in the art. Provided that the same technical effect is achieved, the base station is not limited to specific technical vocabulary. It should be noted that the base station in an NR system is merely used as an example, but a specific type of the base station is not limited in the embodiments of this disclosure.

The base station can communicate with the terminal 11 under the control of a base station controller. In various examples, the base station controller may be a part of the core network or some base stations. Some base stations can exchange control information or user data with the core network through backhaul. In some examples, some of these base stations may communicate directly or indirectly with each other through a backhaul link, and the backhaul link may be a wired or wireless communication link. The wireless communications system can support operations on a plurality of carriers (waveform signals of different frequencies). A multi-carrier transmitter can simultaneously transmit a modulated signal on multiple carriers. For example, each communication link may be a multi-carrier signal modulated based on various radio technologies. Each modulated signal can be sent over different carriers and can carry control information (for example, a reference signal or a control channel), overhead information, data, and the like.

The base station can wirelessly communicate with the terminal 11 via one or more access point antennas. Each base station can provide communication coverage for its corresponding coverage area. A coverage area of an access point may be divided into sectors that form merely a part of the coverage area. The wireless communications system may include different types of base stations (for example, a macro base station, a micro base station, or a pico base station). The base station can also use different radio technologies, such as cellular or WLAN radio access technologies. The base station can be associated with the same or different access networks or operator deployment. Coverage areas of different base stations (including coverage areas of base stations of the same or different types, coverage areas using the same or different radio technologies, or coverage areas belonging to the same or different access networks) may overlap.

A communication link in the wireless communications system may include an uplink for carrying uplink (UL) transmission (for example, from the terminal 11 to the network device 12) or a downlink for carrying downlink (DL) transmission (for example, from the network device 12 to the terminal 11). The UL transmission may also be referred to as reverse link transmission, and the DL transmission may also be referred to as forward link transmission. The DL transmission may be performed over a licensed frequency band, an unlicensed band, or the both. Similarly, the UL transmission may be performed over a licensed frequency band, an unlicensed band, or the both.

Figure 2:
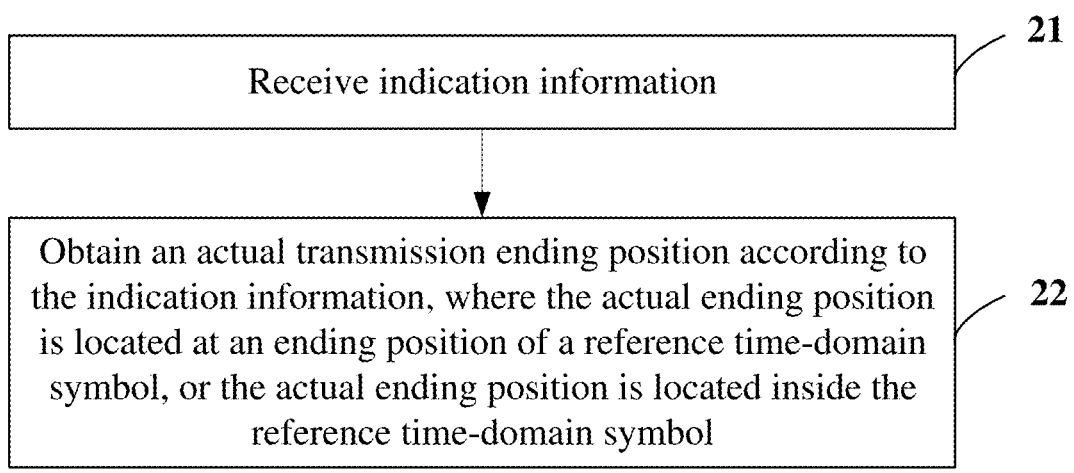
FIG. 2 illustrates a schematic flowchart of an unlicensed band information transmission method by a terminal according to an embodiment of the present disclosure.

An unlicensed band information transmission method according to an embodiment of the present disclosure is applied to a terminal. As shown in FIG. 2, the method includes steps 21 to 22:

Step 21. Receive indication information.

The indication information is used to indicate an actual ending position of transmission, and the indication information may directly indicate the actual ending position of transmission through one indicator field, or indirectly indicate the actual ending position of transmission through multiple indicator fields.

The indication information may be carried in downlink control information (DCI), or the indication information may also be carried in a radio resource control (RRC).

Step 22. Obtain an actual ending position of transmission according to the indication information, where the actual ending position is located at an ending position of a reference time-domain symbol, or the actual ending position is located inside the reference time-domain symbol.

The transmission mentioned here, which may be referred to as transmission burst, may be an uplink (UL) transmission by a terminal or a downlink (DL) transmission by a network device. In a case that the transmission is a UL transmission, a transmission following the transmission may be a UL transmission or a DL transmission by a network device. In a case that the transmission is a DL transmission, a transmission following the transmission may be a UL transmission. A gap between two transmissions may be used for transmit/receive (Rx/Tx) switching, or Rx/Tx switching plus LBT. The determining of an actual ending position of transmission may also be the determining of an ending position of a former UL transmission in two UL transmissions. The reference time-domain symbol in the embodiment of the present disclosure may refer to any time-domain symbol (such as a OFDM symbol, OS for short), that is, the actual ending position of transmission may be located at an ending position, or what is called a boundary or an ending boundary, of a specific time-domain symbol, or the actual ending position of transmission may be located inside a time-domain symbol. The inside mentioned here refers to a position other than the ending position. In this way, the transmission ending position is more flexible, and the problem of granularity matching between transmission scheduling and unlicensed band transmission can be resolved, ensuring normal UL transmission and DL transmission on an unlicensed band.

The following embodiments of the present disclosure will further describe indication information and how a terminal determines an actual ending position of transmission with reference to the accompanying drawings. An indication mode of the indication information includes but is not limited to:

Mode 1. Joint Indication of the Indication Information Through Multiple Indicator Fields In this mode, the indication information includes: a first indicator field used to indicate whether the actual ending position is an ending position of time-domain resource allocation; and a second indicator field used to indicate a first offset between the actual ending position and the ending position of the reference time-domain symbol.

Taking the indication information carried in DCI as an example, it is assumed that a network device uses a first indicator field of 1 bit in the DCI to indicate whether a transmission ends at an ending position or a boundary of a specific time-domain symbol (such as a time-domain symbol of time-domain resource allocation). For example, in a case that a 1 bit value of the first indicator field is 1, it indicates that the actual ending position is a scheduled ending position indicated by a "time-domain resource allocation" field in the DCI. In a case that a 1 bit value of the first indicator field is 0, it indicates that the actual ending position is not a scheduled ending position indicated by a "time-domain resource allocation" field in the DCI, and in this case, the actual ending position may be located inside a time-domain symbol where the ending position indicated by the "time-domain resource allocation" field is located or inside a time-domain symbol before and after a time-domain symbol where the ending position is located. In other words, the first indicator field indicates whether a next gap/LBT starts from a starting position of one time-domain symbol, or whether a gap/LBT starts from a middle position of one time-domain symbol and ends at an ending position of the time-domain symbol, where the former corresponds to ending a transmission at a boundary of an OS, and the latter corresponds to ending a transmission from inside of an OS.

Optionally, the network device may also use a second indicator field of 1 bit or 2 bits in DCI to indicate a first offset between an actual ending position of transmission and an ending position of a reference time-domain symbol, to realize the purpose of indicating an actual ending position of transmission. The reference time-domain symbol includes: a last time-domain symbol of time-domain resource allocation, or an M-th time-domain symbol before the ending position of time-domain resource allocation, or an N-th time-domain symbol after the ending position of time-domain resource allocation, where M and N are integers greater than or equal to 1.

The first offset includes: 16 µs or 25 µs. Taking a last time-domain symbol of time-domain resource allocation serving as the reference time-domain symbol as an example and assuming that the second indicator field includes 1 bit, in a case that the 1 bit value of the second indicator field is 0, it indicates that the actual ending position is: the ending position of the reference time-domain symbol−16 µs; and in a case that the 1 bit value of the second indicator field is 1, it indicates that the actual ending position is: the ending position of the reference time-domain symbol−25 µs.

Optionally, the indication information further includes: a third indicator field, used to indicate whether to end timing advance (TA) in advance. Assuming that the network device uses 1 bit in DCI as the third indicator field, in a case that a 1 bit value of the third indicator field is 1, it indicates that an impact of transmission delay is taken into account; and in a case that a 1 bit value of the third indicator field is 0, it indicates that an impact of transmission delay is not taken into account. In a case that an impact of transmission delay is not taken into account, TA in an actual transmission position may be ignored, and in a case that the 1 bit value of the second indicator field is 1, it indicates that the actual ending position is: an ending position of the reference time-domain symbol−25 µs; in a case that an impact of transmission delay is taken into account and the 1 bit value of the second indicator field is 1, it indicates that the actual ending position is: an ending position of the reference time-domain symbol−25 µs—TA.

In this mode, step 22 includes the following scenarios:

Scenario 1: in a case that the first indicator field indicates that the actual ending position is not an ending position of time-domain resource allocation, an actual ending position of transmission is obtained according to the second indicator field.

For example, the network device adds a first indicator field of 1 bit to the DCI to indicate whether the actual ending position of a UL transmission or a DL transmission is an ending position of time-domain resource allocation, that is, to indicate whether the UL transmission by the terminal or the DL transmission by the network device ends from a boundary of a time-domain symbol where an ending position indicated by the DCI "time-domain resource allocation" field is located. For example, the 1 bit value of the first indicator field is 1, which indicates that the actual ending position of transmission is the ending position (or what is called a scheduled ending position) indicated by the "time-domain resource allocation" field in the DCI, such as an ending position that the terminal can infer according to a starting position and a duration. The 1 bit value of the first indicator field is 0, which indicates that the actual ending position is inside a time-domain symbol where the scheduled ending position is located or inside a time-domain symbol before and after a time-domain symbol where the scheduled ending position is located. If the terminal uses LBT of category1, a gap between two transmissions is not greater than 16 µs; if the terminal uses LBT of category2, it is required to conduct LBT of 25 µs. In a case that a next transmission starts from a boundary of a time-domain symbol, an ending position of a previous transmission must be inside a time-domain symbol, to meet a requirement of a gap or LBT. In a case that a transmission ending position is inside a time-domain symbol, for a UL transmission or a DL transmission, the network device may indicate an actual ending position of transmission for the terminal through a second indicator field of 1 bit or 2 bits, and the terminal or the network device starts Tx/Rx switching or Tx/Rx switching and LBT after the actual ending position.

Figure 3:
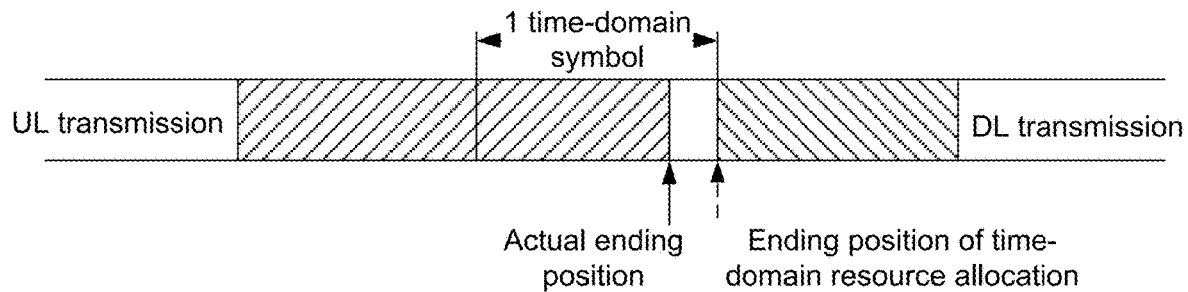
FIG. 3 illustrates a schematic diagram 1 of a mapping relationship between transmitted resources according to an embodiment of the present disclosure.

This scenario is a scenario where a transmission ends inside a specific time-domain symbol. In a case that the actual ending position of transmission is inside the specific time-domain symbol, taking switching a UL transmission to a DL transmission an example as shown in FIG. 3, the UL transmission is performed before the DL transmission, and a time-domain symbol is reserved between an ending position of the UL transmission and an indicated starting position of the DL transmission for Tx/Rx switching or Tx/Rx switching and LBT. In order to make a gap between two transmissions not greater than 16 µs or 25 µs, the actual ending position of the UL transmission must be inside a time-domain symbol where an ending position of time-domain resource allocation (indicated time-domain resource) is located, that is, the scenario where the first indicator field indicates that the actual ending position is not the ending position of time-domain resource allocation; in a case that the 1 bit value of the second indicator field is 0, it indicates that the actual ending position is: the ending position of the reference time-domain symbol−16 µs, and in a case that the 1 bit value of the second indicator field is 1, it indicates that the actual ending position is: the ending position of the reference time-domain symbol−25 µs, where in a case that the reference time-domain symbol is the one last time-domain symbol scheduled by a time-domain resource and the 1 bit value of the second indicator field is 0, it indicates that the actual ending position is: an ending position of time-domain resource scheduling−16 µs, and in a case that the 1 bit value of the second indicator field is 1, it indicates that the actual ending position is: an ending position of time-domain resource scheduling−25 µs. It is worth pointing out that the foregoing embodiment is also applicable to scenarios of switching a DL transmission to a UL transmission and two consecutive UL transmissions.

Figure 4:
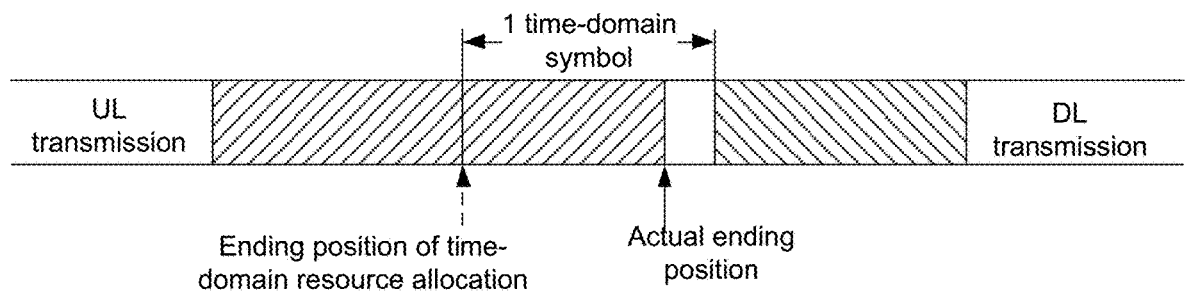
FIG. 4 illustrates a schematic diagram 2 of a mapping relationship between transmitted resources according to an embodiment of the present disclosure.

When the actual ending position is calculated as described above, multiple time-domain symbols may also be deferred, that is, the reference time-domain symbol is an N-th time-domain symbol (N≥1) after the ending position of the time-domain resource scheduling. As shown in FIG. 4, in order to make a gap between two transmissions not greater than 16 μs or 25 μs, the actual ending position of the UL transmission must be inside a specific time-domain symbol, that is, in a case that the first indicator field indicates that the actual ending position is not the ending position of time-domain resource allocation; in a case that the 1 bit value of the second indicator field is 0, it indicates that the actual ending position is: the ending position of the reference time-domain symbol−16 μs, and in a case that the 1 bit value of the second indicator field is 1, it indicates that the actual ending position is: the ending position of the reference time-domain symbol−25 μs, where in a case that the reference time-domain symbol is the first one time-domain symbol after the ending position of time-domain resource scheduling and the 1 bit value of the second indicator field is 0, it indicates that the actual ending position is: an ending position+1OS−16 μs scheduled by a time-domain resource, in a case that the 1 bit value of the second indicator field is 1, it means that the actual ending position is: the ending position of time-domain resource scheduling+1OS−25 μs. It is worth pointing out that the foregoing embodiment is also applicable to scenarios of switching a DL transmission to a UL transmission and two consecutive UL transmissions.

It is worth pointing out that for the case where SCS is greater than 30 kHz, when the actual ending position is calculated as described above, multiple time-domain symbols may be deferred, that is, the reference time-domain symbol is the N-th time-domain symbol after the ending position of the time-domain resource scheduling. In this scenario, in a case that the 1 bit value of the second indicator field is 0, it indicates that the actual ending position is: the ending position of the time-domain resource scheduling+ N*OS−16 μs, and in a case that the 1 bit value of the second indicator field is 1, it indicates that the actual ending position is: the ending position of time-domain resource scheduling+ N*OS−25 μs. A quantity of time-domain symbols (that is, a value of N) to be deferred depends on a quantity of time-domain symbols reserved for Tx/Rx switching and LBT, and the value may be greater than 1. The value of N may be indicated in RRC or DCI, or pre-defined (for example, directly set forth in a protocol).

When the actual ending position is calculated as described above, multiple time-domain symbols may be advanced, that is, the reference time-domain symbol is an M-th (M≥1) time-domain symbol before the ending position of the time-domain resource scheduling. In order to make a gap between two transmissions not greater than 16 μs or 25 μs, the actual ending position of the UL transmission must be inside a specific time-domain symbol, that is, in a case that the first indicator field indicates that the actual ending position is not the ending position of time-domain resource allocation; in a case that the 1 bit value of the second indicator field is 0, it indicates that the actual ending position is: the ending position of the reference time-domain symbol−16 μs, and in a case that the 1 bit value of the second indicator field is 1, it indicates that the actual ending position is: the ending position of the reference time-domain symbol−25 μs, where in a case that the reference time-domain symbol is the M-th time-domain symbol before the ending position of the time-domain resource scheduling and the 1 bit value of the second indicator field is 0, it indicates that the actual ending position is: the ending position of the time-domain resource scheduling−M* OS−16 μs, and in a case that the 1 bit value of the second indicator field is 1, it indicates that the actual ending position is: the ending position of the time-domain resource scheduling−M* OS−25 μs. A quantity of time-domain symbols (that is, a value of M) to be advanced depends on a quantity of time-domain symbols reserved for Tx/Rx switching and LBT, and the value may be greater than 1. The value of M may be indicated in RRC or DCI, or pre-defined (for example, directly set forth in a protocol). It is worth pointing out that the foregoing embodiment is also applicable to scenarios of switching a DL transmission to a UL transmission and two consecutive UL transmissions.

Scenario 2: in a case that the first indicator field indicates that the actual ending position is an ending position of time-domain resource allocation, the second indicator field is ignored.

In a case that the first indicator field in the indication information indicates that the actual ending position of transmission is at the ending position of time-domain resource allocation (indicated time-domain resource), the second indicator field is no longer deciphered, that is, content indicated by the second indicator field is invalid.

It is worth pointing out that whether the second indicator field is valid or not requires detecting whether the first indicator field indicates that the actual ending position is the ending position of time-domain resource allocation; if the first indicator field indicates that the actual ending position is not the ending position of time-domain resource allocation, the content indicated by the second indicator field is valid; and if the first indicator field indicates that the actual ending position is the ending position of time-domain resource allocation, the content indicated by the second indicator field is invalid.

Mode 2. Direct Indication of the Indication Information Through One Indicator Field In this mode, the indication information includes: a fourth indicator field used for indicating a second offset between the actual ending position and the ending position of the reference time-domain symbol.

The second offset includes 0 μs, 16 μs, 25 μs or a sum of 25 μs and TA. Taking the indication information carried in DCI as an example, the network device uses the fourth indicator field of 2 bits in the DCI to indicate the actual ending position of transmission, where the 2 bits in the fourth indicator field are used to indicate the second offset between the actual ending position and the ending position of the reference time-domain symbol. The reference time-domain symbol is related to time-domain resource scheduling, where the reference time-domain symbol includes a last time-domain symbol of time-domain resource allocation, or an N-th time-domain symbol after an ending position of time-domain resource allocation. N is an integer greater than or equal to 1. For example, a 2 bits value of the fourth indicator field is 00, which indicates that the actual ending position is an ending position indicated by a "time-domain resource allocation" field in DCI; the 2 bits value of the fourth indicator field is 01, which indicates that the actual ending position is the reference time-domain symbol−16 μs; the 2 bits value of the fourth indicator field is 10, which indicates that the actual ending position of transmission is the reference time-domain symbol−25 μs; the 2 bits value of the fourth indicator field is 11, which indicates that the actual ending position of transmission is the reference time-domain symbol−25 μs−TA.

In a case that the reference time-domain symbol is the last time-domain symbol scheduled by a time-domain resource, the 2 bits value of the fourth indicator field is 00, which indicates that the actual ending position is an ending position indicated by a "time-domain resource allocation" field in DCI; the 2 bits value of the fourth indicator field is 01, which indicates that the actual ending position is: an ending position indicated by a "time-domain resource allocation" field in DCI−16 μs; the 2 bits value of the fourth indicator field is 10, which indicates that the actual ending position of transmission is: an ending position indicated by a "time-domain resource allocation" field in DCI−25 μs; the 2 bits value of the fourth indicator field is 11, which indicates that the actual ending position of transmission is: an ending position indicated by a "time-domain resource allocation" field in DCI−25 μs−TA.

For the case where SCS is greater than 30 kHz, when the actual ending position is calculated as described above, multiple time-domain symbols may be deferred, that is, the reference time-domain symbol is the N-th time-domain symbol after the ending position of the time-domain resource scheduling. In this scenario, the 2 bits value of the fourth indicator field is 01, which indicates that the actual ending position is: an ending position indicated by a "time-domain resource allocation" field in DCI+N*OS−16 μs; the 2 bits value of the fourth indicator field is 10, which indicates that the actual ending position of transmission is: an ending position indicated by a "time-domain resource allocation" field in DCI+N*OS−25 μs; the 2 bits value of the fourth indicator field is 11, which indicates that the actual ending position of transmission is: an ending position indicated by a "time-domain resource allocation" field in DCI+N*OS−25 μs−TA. A quantity of time-domain symbols (that is, a value of N) to be deferred depends on a quantity of time-domain symbols reserved for Tx/Rx switching and LBT, and the value may be greater than 1. The value of N may be indicated in RRC or DCI, or pre-defined (for example, directly set forth in a protocol).

For the case where SCS is greater than 30 kHz, when the actual ending position is calculated as described above, multiple time-domain symbols may be deferred, that is, the reference time-domain symbol is an M-th time-domain symbol before the ending position of the time-domain resource scheduling. In this scenario, the 2 bits value of the fourth indicator field is 01, which indicates that the actual ending position is: an ending position indicated by a "time-domain resource allocation" field in DCI−M*OS−16 μs; the 2 bits value of the fourth indicator field is 10, which indicates that the actual ending position of transmission is: an ending position indicated by a "time-domain resource allocation" field in DCI−M*OS−25 μs; the 2 bits value of the fourth indicator field is 11, which indicates that the actual ending position of transmission is: an ending position indicated by a "time-domain resource allocation" field in DCI−M*OS−25 μs−TA. A quantity of time-domain symbols (that is, a value of M) to be advanced depends on a quantity of time-domain symbols reserved for Tx/Rx switching and LBT, and the value may be greater than 1. The value of M may be indicated in RRC or DCI, or pre-defined (for example, directly set forth in a protocol).

It is worth pointing out that in a case that an impact of transmission delay is not taken into account and the 2 bits value of the fourth indicator field is 11, it is regarded as invalid.

The foregoing describes different implementation manners of how the indication information indicates the actual ending position of transmission, and different manners of processing different actual ending positions by the terminal. The following embodiment of the present disclosure will further describes an action of the terminal after determining the actual ending position of transmission. After step 22, the method further includes: sending preset information in a time-domain resource before the actual ending position in the reference time-domain symbol, where the preset information includes at least one of a reservation signal, (useful) data, a reference signal or a cyclic prefix extension (extended CP). In other words, the terminal may transmit information in a part of the time-domain symbol where the transmission ends, such as the scenarios of switching a UL transmission to a DL transmission or two consecutive UL transmission.

In the unlicensed band information transmission method according to the embodiment of the present disclosure, the actual ending position of the UL transmission by the terminal may be located at an ending position of a specific time-domain symbol, or inside a specific time-domain symbol, thus the transmission ending position is more flexible and the problem of granularity matching between information scheduling and unlicensed band transmission can be resolved, further ensuring the normal UL transmission on an unlicensed band.

The unlicensed band information transmission methods in different scenarios are described in detail in the foregoing embodiment. A terminal corresponding to the method is further described in the following embodiment with reference to the accompanying drawings.

Figure 5:
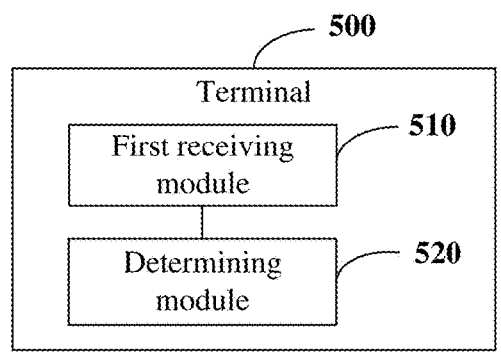
FIG. 5 illustrates a schematic structural diagram of a module of a terminal according to an embodiment of the present disclosure.

As shown in FIG. 5, the terminal 500 according to this embodiment of the present disclosure can implement details of the method of receiving the indication information, and determining the actual ending position of transmission according to the indication information as described in the foregoing embodiment, where the actual ending position is located at the ending position of the reference time-domain symbol, or the actual ending position is located inside the reference time-domain symbol, and a same effect is achieved. The terminal 500 specifically includes the following function modules:

a first receiving module 510, configured to receive indication information; and a determining module 520, configured to obtain an actual ending position of transmission according to the indication information, where the actual ending position is located at an ending position of a reference time-domain symbol, or the actual ending position is located inside the reference time-domain symbol.

The indication information includes:

a first indicator field, used to indicate whether the actual ending position is an ending position of time-domain resource allocation; and a second indicator field, used to indicate a first offset between the actual ending position and the ending position of the reference time-domain symbol.

The determining module 520 includes one of the following:

a first determining submodule, configured to obtain an actual ending position of transmission according to the second indicator field in a case that the first indicator field indicates that the actual ending position is not an ending position of time-domain resource allocation; and a second determining submodule, configured to ignore the second indicator field in a case that the first indicator field indicates that the actual ending position is an ending position of time-domain resource allocation.

The indication information further includes:

a third indicator field, used to indicate whether to end timing advance in advance.

The first offset includes: 16 μs or 25 μs.

The indication information includes:

a fourth indicator field, used to indicate a second offset between the actual ending position and the ending position of the reference time-domain symbol.

The second offset includes 0 μs, 16 μs, 25 μs or a sum of 25 μs and TA.

The reference time-domain symbol includes: a last time-domain symbol of time-domain resource allocation, or an M-th time-domain symbol before the ending position of time-domain resource allocation, or an N-th time-domain symbol after the ending position of time-domain resource allocation, where M and N are integers greater than or equal to 1.

The indication information is carried in downlink control information, or the indication information is carried in radio resource control signaling.

The terminal 500 further includes:

a first transmitting module, configured to send preset information in a time-domain resource before the actual ending position in the reference time-domain symbol, where the preset information includes at least one of a reservation signal, data, a reference signal or a cyclic prefix extension.

It is worth pointing out that the actual ending position of the UL transmission by the terminal according to the embodiment of the present disclosure may be located at an ending position of a specific time-domain symbol or inside a specific time-domain symbol, thus the transmission ending position is more flexible and the problem of granularity matching between information scheduling and unlicensed band transmission can be resolved, further ensuring the normal UL transmission on a unlicensed band.

Figures 6, 7:
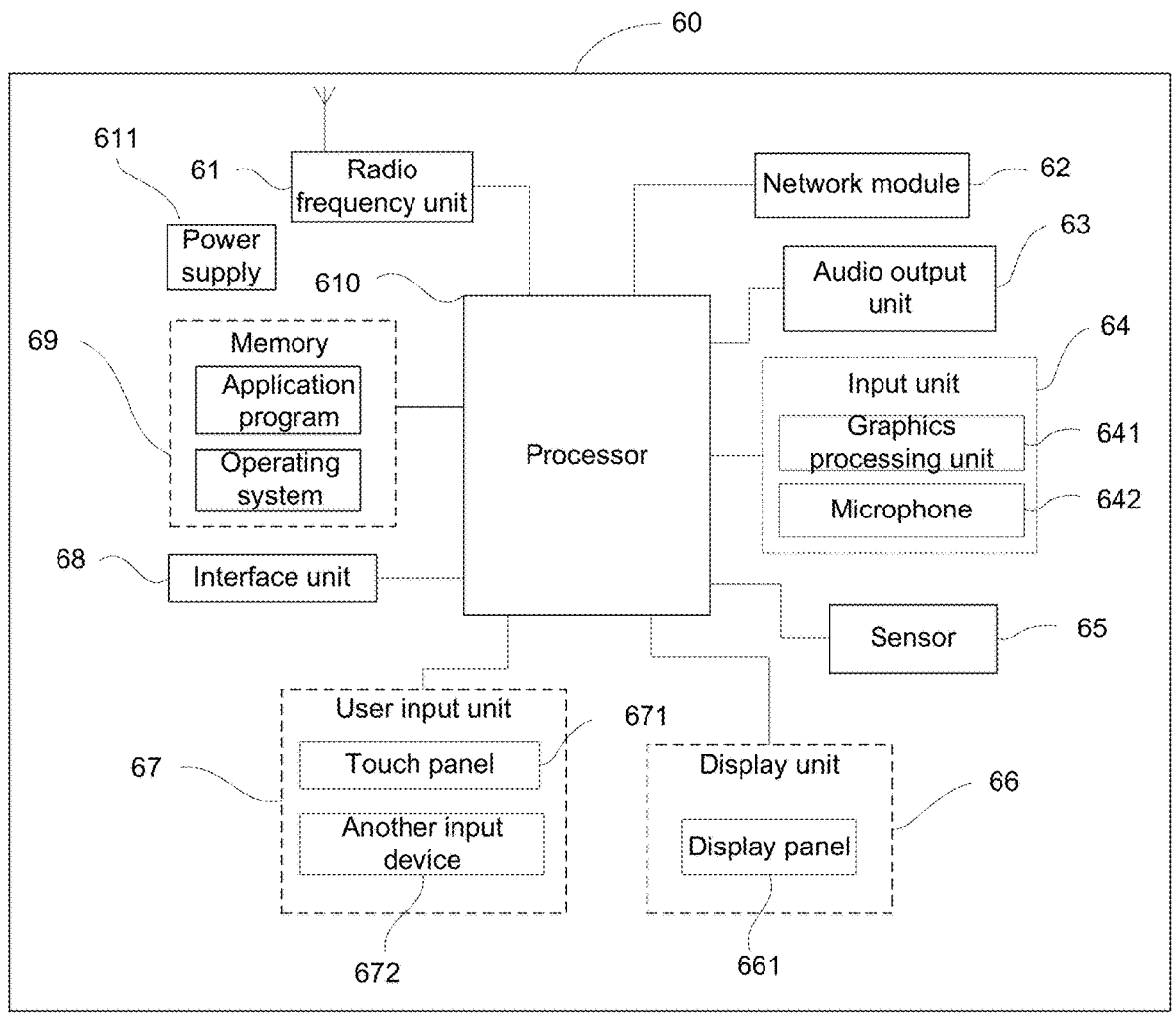
FIG. 6 illustrates a block diagram of a terminal according to an embodiment of the present disclosure.
FIG. 7 illustrates a schematic flowchart of an unlicensed band information transmission method by a network device according to an embodiment of the present disclosure.

To achieve the foregoing objectives in a better way, further, FIG. 6 illustrates a schematic structural diagram of hardware of a terminal for implementing the embodiments of the present disclosure. The terminal 60 includes but is not limited to: a radio frequency unit 61, a network module 62, an audio output unit 63, an input unit 64, a sensor 65, a display unit 66, a user input unit 67, an interface unit 68, a memory 69, a processor 610, and a power supply 611 and another component. A person skilled in the art may understand that the structure of the terminal shown in FIG. 6 does not constitute a limitation to the terminal. The terminal may include more or fewer components than those shown in the figure, or some components may be combined, or there may be a different component arrangement. In the embodiment of the present disclosure, the terminal includes but is not limited to a mobile phone, a tablet computer, a notebook computer, a palmtop computer, a vehicle terminal, a wearable device, a pedometer, and the like.

where the radio frequency unit 61 is configured to receive indication information; and the processor 610 is configured to obtain an actual ending position of transmission according to the indication information, where the actual ending position is located at an ending position of a reference time-domain symbol, or the actual ending position is located inside the reference time-domain symbol.

The actual ending position of the UL transmission by the terminal according to the embodiment of the present disclosure may be located at an ending position of a specific time-domain symbol or inside a specific time-domain symbol, thus the transmission ending position is more flexible and the problem of granularity matching between information scheduling and unlicensed band transmission can be resolved, further ensuring the normal UL transmission on a unlicensed band.

It should be understood that in the embodiment of the present disclosure, the radio frequency unit 61 may be configured to receive and transmit information, or to receive and transmit a signal in a calling process. For example, the radio frequency unit 61 is configured to receive downlink data from a base station which is processed by the processor 610, and in addition, to send uplink data to a base station. Generally, the radio frequency unit 61 includes but is not limited to an antenna, at least one amplifier, a transceiver, a coupler, a low noise amplifier, a duplexer, and the like. In addition, the radio frequency unit 61 may also communicate with a network and another device through a radio communications system.

The terminal provides a user with wireless broadband Internet access through the network module 62, for example, help the user send and receive emails, browse web pages, and access streaming media.

The audio output unit 63 may convert audio data received by the radio frequency unit 61 or the network module 62 or stored in the memory 69 into an audio signal and output the audio signal as a sound. Moreover, the audio output unit 63 may provide audio output related to a specific function performed by the terminal 60 (such as a call signal reception sound, a message reception sound, or the like) as well. The audio output unit 63 includes a loudspeaker, a buzzer, a telephone receiver, and the like.

The input unit 64 is configured to receive an audio or video signal. The input unit 64 may include a graphics processing unit (GPU) 641 and a microphone 642. The graphics processing unit 641 processes image data of a static image or video obtained by an image capture apparatus (such as, a camera) in a video capture mode or an image capture mode. A processed image frame may be displayed on the display unit 66. An image frames processed by the graphics processing unit 641 may be stored in the memory 69 (or another storage medium) or sent via the radio frequency unit 61 or the network module 62. The microphone 642 may receive a sound and can process such sound into audio data. The processed audio data can be converted into a format output that can be sent to a mobile communications base station through the radio frequency unit 61 in a telephone call mode.

The terminal 60 further includes at least one sensor 65, for example, an optical sensor, a motion sensor, and other sensors. The light sensor includes an ambient light sensor and a proximity sensor, where the ambient light sensor can adjust brightness of the display panel 661 according to brightness of ambient light, and the proximity sensor can turn off the display panel 661 and/or backlight when the terminal 60 moves towards the ear. As a type of the motion sensor, an accelerometer sensor may detect an acceleration in each direction (generally, three axes), and detect a value and a direction of gravity when the accelerometer sensor is static, and may be used to recognize a terminal posture (such as screen switching between landscape and portrait modes, a related game, or magnetometer posture calibration), a function related to vibration recognition (such as a pedometer or a knock), and the like. The sensor 65 may further include a fingerprint sensor, a pressure sensor, an iris sensor, a molecule sensor, a gyroscope, a barometer, a hygrometer, a thermometer, and an infrared sensor. Details are not described herein.

The display unit 66 is configured to display information input by a user or information provided to a user. The display unit 66 may include a display panel 661, where the display panel 661 may be configured by using a liquid crystal display (LCD), an organic light-emitting diode (OLED), or the like.

The user input unit 67 may be configured to receive inputted digit or character information and generate key signal input related to user setting and function control of the terminal. The user input unit 67 includes a touch panel 671 and another input device 672. The touch panel 671, also known as a touchscreen, can collect a user touch operation on or near it (such as an operation on or near the touch panel 671 made by the user via a finger, a stylus, another suitable object or accessory). The touch panel 671 may include two parts: a touch detection apparatus and a touch controller. The touch detection apparatus detects a user's touch position, and a signal generated by a touch operation, and transmits the signal to the touch controller; the touch controller receives touch information from the touch detection apparatus, sends the information to the processor 610 after switching it into a contact coordinate, receives and executes a command sent by the processor 610. In addition, the touch panel 671 may be implemented as a touch panel of many types such as a resistive touch panel, a capacitive touch panel, an infrared touch panel, and a surface acoustic wave touch panel. In addition to the touch panel 671, the user input unit 67 may further include the another input device 672. For example, the another input device 672 may include but is not limited to, a physical keyboard, a function key (such as a volume control key, a switch key), a trackball, a mouse, and a joystick, which is no longer repeated here.

Further, the touch panel 671 may cover the display panel 661. When detecting a touch operation on or near it, the touch panel 671 transmits it to the processor 610 to determine a type of a touch event, and then the processor 610 provides a corresponding visual output on the display panel 661 according to the type of the touch event. Although in FIG. 6, the touch panel 671 and the display panel 661 are two independent components to implement input and output functions of the terminal, the touch panel 671 and the display panel 661 may be integrated to implement the input and output functions of the terminal in some embodiments, which is not specifically limited here.

The interface unit 68 is an interface connecting an external apparatus to the terminal 60. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and a headset port. The interface unit 68 may be configured to receive an input (such as data information, electric power) from the external apparatus and transmit the received input to one or more elements within the terminal 60, or the interface unit 68 may be configured to transmit data between the terminal 60 and the external apparatus.

The memory 69 may be configured to store a software program as well as every kind of data. The memory 69 may primarily include a program storage area and a data storage area, where the program storage area may store an operating system, an application program (such as a sound playing function, an image playing function) required for at least one function, and the like; and the data storage area may store data (such as audio data, a phone book) created based on the use of a mobile phone. In addition, the memory 69 may include a high-speed random access memory, and may further include a non-volatile memory such as at least one magnetic disk storage component, a flash memory component, or another volatile solid-state storage component.

The processor 610 is a control center of the terminal, connects various parts of the entire terminal by using various interfaces and circuits, and performs various functions of the terminal and processes data by running or executing software programs and/or modules stored in the memory 69 and invoking data stored in the memory 69, so as to monitor the terminal as a whole. The processor 610 may include one or more processing units. Optionally, the processor 610 may integrate an application processor and a modem processor. The application processor mainly deals with an operating system, a user interface, an application program, and the like. The modem processor mainly deals with wireless communication. It can be understood that the foregoing modem processor may not be integrated into the processor 610.

The terminal 60 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the terminal 60 includes some function modules that are not shown, which are no longer repeated here.

Optionally, an embodiment of the present disclosure further provides a terminal, including a processor 610, a memory 69, a computer program that is stored on the memory 69 and executable on the processor 610, where each process of the foregoing embodiments of the unlicensed band information transmission method is implemented in a case that the computer program is executed by the processor 610, and a same technical effect can be achieved, which is no longer repeated here to avoid repetition. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a radio access network (RAN). The wireless terminal may be a mobile terminal, such as a mobile phone (or referred to as a "cellular" phone) and a computer with a mobile terminal, and may be, for example, a portable, pocket-sized, handheld, computer built-in, or vehicle-mounted mobile apparatus, which exchanges language and/or data with a radio access network. For example, the wireless terminal may be a personal communication service (PCS) telephone, a cordless telephone, a session initiation protocol (SIP) phone set, a wireless local loop (WLL) station, a personal digital assistant (PDA), and another device. The wireless terminal may also be referred to as a system, a subscriber unit, a subscriber station, a mobile station, a mobile console, a remote station, a remote terminal, an access terminal, a user terminal, a user agent, or a user device or user equipment. This is not limited herein.

An embodiment of the present disclosure further provides a computer-readable storage medium, where the computer-readable storage medium stores a computer program, and each process of the foregoing embodiments of the foregoing unlicensed band information transmission method is implemented in a case that the computer program is executed by a processor, and a same technical effect can be achieved, which is no longer repeated here to avoid repetition. The computer-readable storage medium may be a read-only memory (ROM), a random access memory (RAM), a magnetic disk, a compact disc, or the like.

The foregoing embodiment introduces the unlicensed band information transmission method of the present disclosure from the perspective of a terminal. The following embodiment will further introduce the unlicensed band information transmission method for a network device with reference to the accompanying drawings.

As shown in FIG. 7, an unlicensed band information transmission method according to an embodiment of the present disclosure is applied to a network device, and the method includes the following steps:

Step 71. Send indication information to a terminal, where the indication information is used to indicate an actual ending position of transmission, and the actual ending position is located at an ending position of a reference time-domain symbol, or the actual ending position is located inside the reference time-domain symbol.

The indication information is used to indicate an actual ending position of transmission, and the indication information may directly indicate the actual ending position of transmission through one indicator field, or indirectly indicate the actual ending position of transmission through multiple indicator fields. Further, the indication information may be carried in DCI, or the indication information may also be carried in RRC.

The reference time-domain symbol in the embodiment of the present disclosure may refer to any time-domain symbol (such as an OFDM symbol), that is, the actual ending position of transmission may be located at an ending position of a specific time-domain symbol, or the actual ending position may be located at a boundary or an ending boundary of a specific time-domain symbol. In addition, the actual ending position of transmission may also be located inside a specific time-domain symbol. The inside mentioned here refers to a position other than the ending position. In this way, the transmission ending position is more flexible, and the problem of granularity matching between transmission scheduling and unlicensed band transmission can be resolved, ensuring normal UL transmission and DL transmission on an unlicensed band.

Taking joint indication of the indication information through multiple indicator fields as an example, the indication information includes but is not limited to: a first indicator field used to indicate whether the actual ending position is an ending position of time-domain resource allocation; and a second indicator field used to indicate a first offset between the actual ending position and the ending position of the reference time-domain symbol.

Taking the indication information carried in DCI as an example, it is assumed that a network device uses a first indicator field of 1 bit in the DCI to indicate whether a transmission ends at an ending position or a boundary of a specific time-domain symbol (such as a time-domain symbol of time-domain resource allocation). In other words, the first indicator field indicates whether a next gap/LBT starts from a starting position of one time-domain symbol, or whether a gap/LBT starts from a middle position of one time-domain symbol and ends at an ending position of the time-domain symbol, where the former corresponds to ending a transmission at an ending boundary of an OS, and the latter corresponds to ending a transmission from inside of an OS.

Further, the network device may also use a second indicator field of 1 bit or 2 bits in DCI to indicate a first offset between an actual ending position of transmission and an ending position of a reference time-domain symbol, to realize the purpose of indicating an actual ending position of transmission. The reference time-domain symbol includes: a last time-domain symbol of time-domain resource allocation, or an M-th time-domain symbol before the ending position of time-domain resource allocation, or an N-th time-domain symbol after the ending position of time-domain resource allocation, where M and N are integers greater than or equal to 1.

The first offset includes: 16 μs or 25 μs. Taking a last time-domain symbol of time-domain resource allocation serving as the reference time-domain symbol as an example and assuming that the second indicator field includes 1 bit, in a case that the 1 bit value of the second indicator field is 0, it indicates that the actual ending position is: the ending position of the reference time-domain symbol−16 μs; and in a case that the 1 bit value of the second indicator field is 1, it indicates that the actual ending position is: the ending position of the reference time-domain symbol−25 μs.

Further, the indication information further includes: a third indicator field, used to indicate whether to end timing advance in advance. Assuming that the network device uses 1 bit in DCI as the third indicator field, in a case that a 1 bit value of the third indicator field is 1, it indicates that an impact of transmission delay is taken into account; and in a case that a 1 bit value of the third indicator field is 0, it indicates that an impact of transmission delay is not taken into account. In a case that an impact of transmission delay is not taken into account, TA in an actual transmission position may be ignored, and in a case that the 1 bit value of the second indicator field is 1, it indicates that the actual ending position is: an ending position of the reference time-domain symbol−25 μs; in a case that an impact of transmission delay is taken into account and the 1 bit value of the second indicator field is 1, it indicates that the actual ending position is: an ending position of the reference time-domain symbol−25 μs−TA.

Taking direct indication of the indication information through one indicator field as an example, the indication information includes: a fourth indicator field used for indicating a second offset between the actual ending position and the ending position of the reference time-domain symbol.

The second offset includes 0 μs, 16 μs, 25 μs or a sum of 25 μs and TA. Taking the indication information carried in DCI as an example, the network device uses the fourth indicator field of 2 bits in the DCI to indicate the actual ending position of transmission, where the 2 bits in the fourth indicator field are used to indicate the second offset between the actual ending position and the ending position of the reference time-domain symbol. The reference time-domain symbol is related to time-domain resource scheduling, where the reference time-domain symbol includes a last time-domain symbol of time-domain resource allocation, or an N-th time-domain symbol after an ending position of time-domain resource allocation. N is an integer greater than or equal to 1.

For example, a 2 bits value of the fourth indicator field is 00, which indicates that the actual ending position is an ending position indicated by a "time-domain resource allocation" field in DCI; the 2 bits value of the fourth indicator field is 01, which indicates that the actual ending position is the reference time-domain symbol−16 μs; the 2 bits value of the fourth indicator field is 10, which indicates that the actual ending position of transmission is the reference time-domain symbol−25 μs; the 2 bits value of the fourth indicator field is 11, which indicates that the actual ending position of transmission is the reference time-domain symbol−25 μs−TA.

In a case that the reference time-domain symbol is the last time-domain symbol scheduled by a time-domain resource, the 2 bits value of the fourth indicator field is 00, which indicates that the actual ending position is an ending position indicated by a "time-domain resource allocation" field in DCI; the 2 bits value of the fourth indicator field is 01, which indicates that the actual ending position is: an ending position indicated by a "time-domain resource allocation" field in DCI−16 μs; the 2 bits value of the fourth indicator field is 10, which indicates that the actual ending position of transmission is: an ending position indicated by a "time-domain resource allocation" field in DCI−25 μs; the 2 bits value of the fourth indicator field is 11, which indicates that the actual ending position of transmission is: an ending position indicated by a "time-domain resource allocation" field in DCI−25 μs−TA.

For the case where SCS is greater than 30 kHz, when the actual ending position is calculated as described above, multiple time-domain symbols may be deferred, that is, the reference time-domain symbol is the N-th time-domain symbol after the ending position of the time-domain resource scheduling. In this scenario, the 2 bits value of the fourth indicator field is 01, which indicates that the actual ending position is: an ending position indicated by a "time-domain resource allocation" field in DCI+N*OS−16 μs; the 2 bits value of the fourth indicator field is 10, which indicates that the actual ending position of transmission is: an ending position indicated by a "time-domain resource allocation" field in DCI+N*OS−25 μs; the 2 bits value of the fourth indicator field is 11, which indicates that the actual ending position of transmission is: an ending position indicated by a "time-domain resource allocation" field in DCI+N*OS−25 μs−TA. A quantity of time-domain symbols (that is, a value of N) to be deferred depends on a quantity of time-domain symbols reserved for Tx/Rx switching and LBT, and the value may be greater than 1. The value of N may be indicated in RRC or DCI, or pre-defined (for example, directly set forth in a protocol).

For the case where SCS is greater than 30 kHz, when the actual ending position is calculated as described above, multiple time-domain symbols may be advanced, that is, the reference time-domain symbol is an M-th time-domain symbol before the ending position of the time-domain resource scheduling. In this scenario, the 2 bits value of the fourth indicator field is 01, which indicates that the actual ending position is: an ending position indicated by a "time-domain resource allocation" field in DCI−M*OS−16 μs; the 2 bits value of the fourth indicator field is 10, which indicates that the actual ending position is: an ending position indicated by a "time-domain resource allocation" field in DCI−16 μs; the 2 bits value of the fourth indicator field is 10, which indicates that the actual ending position of transmission is: an ending position indicated by a "time-domain resource allocation" field in DCI−M*OS−25 μs; the 2 bits value of the fourth indicator field is 11, which indicates that the actual ending position of transmission is: an ending position indicated by a "time-domain resource allocation" field in DCI−M*OS−25 μs−TA. A quantity of time-domain symbols (that is, a value of M) to be advanced depends on a quantity of time-domain symbols reserved for Tx/Rx switching and LBT, and the value may be greater than 1. The value of M may be indicated in RRC or DCI, or pre-defined (for example, directly set forth in a protocol).

It is worth pointing out that in a case that an impact of transmission delay is not taken into account and the 2 bits value of the fourth indicator field is 11, it is regarded as invalid.

The above introduces different implementation manners of how the indication information indicates the actual ending position of transmission. The following embodiment of the present disclosure further includes, after step 71: sending preset information in a time-domain resource before the actual ending position in the reference time-domain symbol, where the preset information includes at least one of a reservation signal, data, a reference signal or a cyclic prefix extension. In other words, the network device may transmit information in a part of the time-domain symbol where the transmission ends, such as the scenario of switching a DL transmission to a UL transmission.

In the unlicensed band information transmission method according to the embodiment of the present disclosure, the actual ending position of the DL transmission by the network device may be located at an ending position of a specific time-domain symbol, or inside a specific time-domain symbol, thus the transmission ending position is more flexible and the problem of granularity matching between information scheduling and unlicensed band transmission can be resolved, further ensuring the normal DL transmission on an unlicensed band.

The foregoing embodiment describes in detail the unlicensed band information transmission method in different scenarios separately. The following embodiment will further introduce a network device corresponding to the method with reference to the accompanying drawings.

Figure 8:
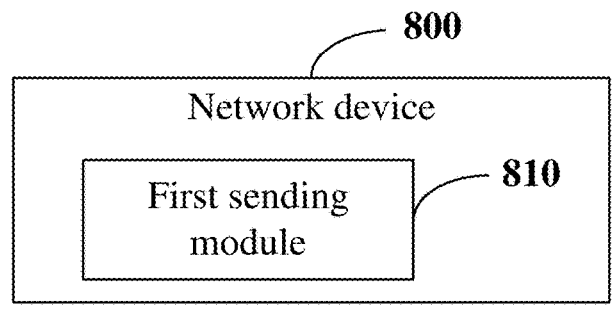
FIG. 8 illustrates a schematic structural diagram of a module of a network device according to an embodiment of the present disclosure.

As shown in FIG. 8, the network device 800 according to this embodiment of the present disclosure can implement sending the indication information to the terminal in the foregoing embodiment, where the indication information is used to indicate the actual ending position of transmission, and the actual ending position is located at the ending position of the reference time-domain symbol, or the actual ending position is located inside the reference time-domain symbol, and a same effect is achieved. The network device 800 specifically includes the following function modules:

a first sending module 810, configured to send indication information to a terminal, where the indication information is used to indicate an actual ending position of transmission, and the actual ending position is located at an ending position of a reference time-domain symbol, or the actual ending position is located inside the reference time-domain symbol.

The indication information includes:

a first indicator field, used to indicate whether the actual ending position is an ending position of time-domain resource allocation; and a second indicator field, used to indicate a first offset between the actual ending position and the ending position of the reference time-domain symbol.

The indication information further includes:

a third indicator field, used to indicate whether to end timing advance in advance.

The first offset includes: 16 μs or 25 μs.

The indication information includes:

a fourth indicator field, used to indicate a second offset between the actual ending position and the ending position of the reference time-domain symbol.

The second offset includes 0 μs, 16 μs, 25 μs or a sum of 25 μs and TA.

The reference time-domain symbol includes: a last time-domain symbol of time-domain resource allocation, or an M-th time-domain symbol before the ending position of time-domain resource allocation, or an N-th time-domain symbol after the ending position of time-domain resource allocation, where M and N are integers greater than or equal to 1.

The indication information is carried in downlink control information, or the indication information is carried in radio resource control signaling.

The network device 800 further includes:
a second transmission module, configured to send preset information in a time-domain resource before the actual ending position in the reference time-domain symbol, where the preset information includes at least one of a reservation signal, data, a reference signal, or a cyclic prefix extension.

It is worth pointing out that the actual ending position of the DL transmission by the network device according to the embodiment of the present disclosure may be located at an ending position of a specific time-domain symbol or inside a specific time-domain symbol, thus the transmission ending position is more flexible and the problem of granularity matching between information scheduling and unlicensed band transmission can be resolved, further ensuring the normal UL transmission and DL transmission on a unlicensed band.

It should be noted that, division of the modules of the network device and the terminal is merely logical function division, and in actual implementation, the modules may be all or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the foregoing apparatus for implementation. In addition, the determining module may also be stored in the memory of the foregoing apparatus in the form of program code, and a processing element of the foregoing apparatus invokes the program code and performs the functions of the foregoing determining module. The implementation of other modules is similar thereto. In addition, all or some of these modules may be integrated together or implemented independently. The processing element herein may be an integrated circuit having a signal processing capability. During implementation, steps of the foregoing method or the foregoing modules may be implemented by hardware integrated logic circuits in the processor element or instructions in the form of software.

For example, the above modules can be configured into one or more integrated circuits to perform the above methods, such as: one or more Application Specific Integrated Circuits (ASIC), one or more digital signal processors (DSP), one or more Field Programmable Gate Arrays (FPGA), or the like. For another example, when a module above is implemented by invoking program code by using a processing element, the processing element may be a general-purpose processor, for example, a central processing unit (CPU) or another processor that can invoke program code. For another example, these modules may be integrated together and implemented in the form of a system-on-a-chip (SOC).

To achieve the foregoing objective in a better way, an embodiment of the present disclosure further provides a network device, where the network device includes a processor, a memory, and a computer program that is stored in the memory and executable on the processor, where steps of the foregoing unlicensed band information transmission method are implemented in a case that the computer program is executed by the processor. An embodiment of the present invention further provides a computer-readable storage medium, where the computer-readable storage medium stores a computer program, and steps of the foregoing unlicensed band information transmission method are implemented in a case that the computer program is executed by a processor.

Figure 9:
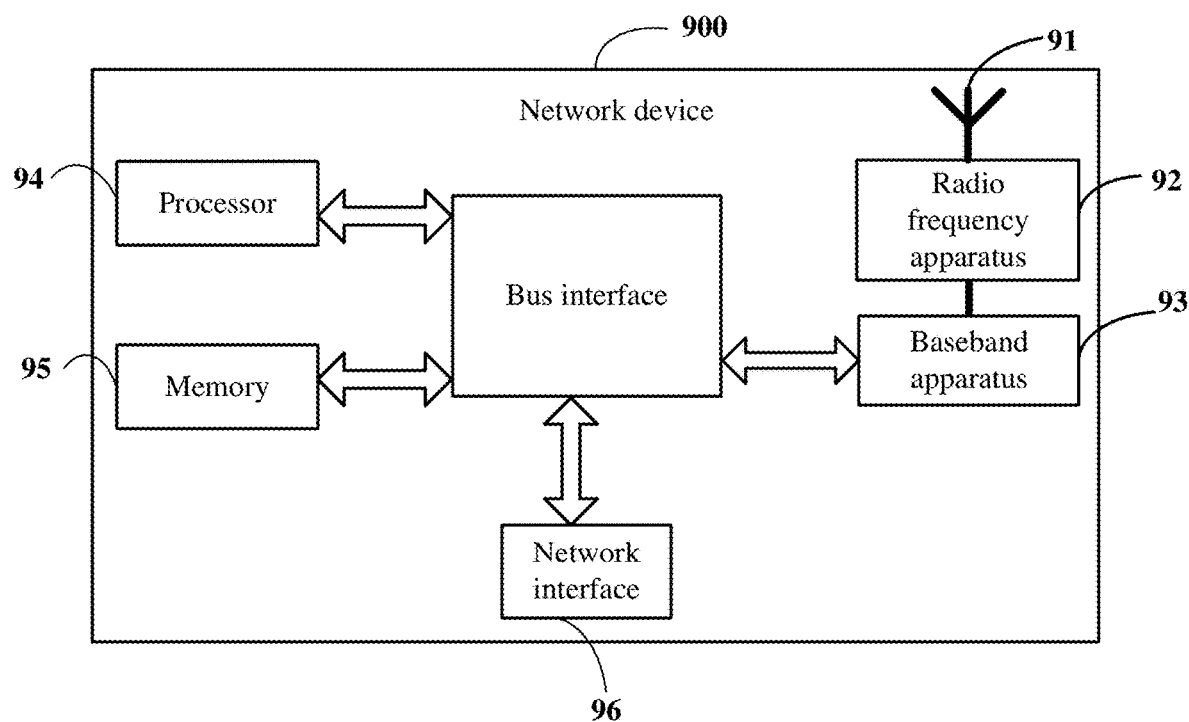
FIG. 9 is a network device block diagram according to an embodiment of the present disclosure.

For example, an embodiment of the present disclosure further provides a network device. As shown in FIG. 9, the network device 900 includes: an antenna 91, a radio frequency apparatus 92, and a baseband apparatus 93. The antenna 91 is connected to the radio frequency apparatus 92. In the uplink direction, the radio frequency apparatus 92 receives information through the antenna 91, and sends the received information to the baseband apparatus 93 for processing. In the downlink direction, the baseband apparatus 93 processes information to be sent and sends the information to the radio frequency apparatus 92, and the radio frequency apparatus 92 processes the received information and then sends the information through the antenna 91.

The foregoing band processing apparatus may be located in the baseband apparatus 93, and the method performed by the network device in the foregoing embodiment may be implemented in the baseband apparatus 93. The baseband apparatus 93 includes a processor 94 and a memory 95.

The baseband apparatus 93 may include, for example, at least one baseband board, and a plurality of chips are arranged on the baseband board. As shown in FIG. 9, one of the chips is, for example, the processor 94, which is connected to the memory 95, to invoke a program in the memory 95, so as to perform the operations of the network device shown in the foregoing method embodiment.

The baseband apparatus 93 may further include a network interface 96 for exchanging information with the radio frequency apparatus 92. The interface is, for example, a common public radio interface (CPRI).

The processor herein may be a single processor, or may be a collective term for a plurality of processing elements. For example, the processor may be a CPU or an ASIC, or may be one or more integrated circuits that are configured to implement the foregoing method performed by the network device, for example, may be one or more microprocessors DSPs, or one or more field programmable gate arrays FPGAs. The storage element may be one memory or a collective term for a plurality of storage elements.

The memory 95 may be a volatile memory or a nonvolatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of exemplary but not restrictive description, many forms of RAMs are available, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM)), and a direct rambus random access memory (DRRAM). The memory 95 described in the present disclosure is intended to include but is not limited to these and any other suitable types of memories.

For example, the network device in this embodiment of the present disclosure further includes a computer program stored in the memory 95 and executable on the processor 94, and the processor 94 invokes the computer program in the memory 95 to perform the method performed by the modules shown in FIG. 8.

For example, when invoked by the processor 94, the computer program may be used to execute: sending indication information to a terminal, where the indication information is used to indicate an actual ending position of transmission, and the actual ending position is located at an ending position of a reference time-domain symbol, or the actual ending position is located inside the reference time-domain symbol.

The actual ending position of the DL transmission by the network device according to the embodiment of the present disclosure may be located at an ending position of a specific time-domain symbol or inside a specific time-domain symbol, thus the transmission ending position is more flexible and the problem of granularity matching between information scheduling and unlicensed band transmission can be resolved, further ensuring the normal UL transmission and DL transmission on a unlicensed band.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in the present disclosure, it should be understood that the disclosed apparatuses and methods may be implemented in other ways. For example, the apparatus embodiments described above are only an example. For example, the division of the units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may be or may not be physically separated, and the components displayed as units may be or may not be physical units, that is, may be located in one place or distributed on multiple network units. Some or all of the units may be selected according to actual needs to achieve the objective of the solutions of the embodiments.

In addition, functional units in each embodiment of the present disclosure may be integrated into one processing unit, or each unit may have separate physical existence, or two or more units may be integrated in one unit.

If the function is implemented in the form of software function units and sold or used as independent products, the function may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

In addition, it should be noted that in the apparatuses and methods of the present disclosure, it is obvious that the components or the steps may be divided and/or recombined. These divisions and/or recombinations should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently. Those of ordinary skill in the art can understand that all or any steps or components of the method and apparatus in the present disclosure may be implemented by hardware, firmware, software, or a combination thereof in any computing apparatus (including a processor, a storage medium, and the like) or a network of a computing apparatus. This can be implemented as long as those of ordinary skill in the art apply basic programming skill after reading the description of the present disclosure.

Therefore, the objective of the present disclosure may also be achieved by running a program or a set of programs on any computing apparatus. The computing apparatus may be a well-known general-purpose apparatus. Therefore, the objective of the present disclosure may also be achieved only by providing a program product including program code for implementing the method or the apparatus. In other words, such a program product also constitutes the present disclosure, and a storage medium storing such a program product also constitutes the present disclosure. Obviously, the storage medium may be any well-known storage medium or any storage medium to be developed in the future. It should also be noted that in the apparatus and method of the present disclosure, apparently, the components or steps may be divided and/or recombined. These divisions and/or recombinations should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently.

The foregoing descriptions are merely optional implementations of the present disclosure. It should be noted that a person of ordinary skill in the art may make several improvements and polishing without departing from the principle of the present disclosure and the improvements and polishing shall fall within the protection scope of the present disclosure.

What is claimed is:

1. An unlicensed band information transmission method, comprising:

receiving, by a terminal, indication information; and obtaining, by the terminal, an actual ending position of transmission according to the indication information, wherein the actual ending position is located at an ending position of an orthogonal frequency division multiple (OFDM) symbol, or the actual ending position is located inside the OFDM symbol; wherein the indication information comprises a first indicator field and a second indicator field, the first indicator field is used to indicate whether the actual ending position is an ending position or inside of the OFDM symbol, and the second indicator field is used to indicate a first offset between the actual ending position and the ending position of the OFDM symbol; or the indication information comprises a fourth indicator field used to indicate a second offset between the actual ending position and the ending position of the OFDM symbol;

the method further comprising:

sending, by the terminal, preset information in a time-domain resource before the actual ending position in the OFDM symbol, wherein the preset information comprises at least one of a reservation signal, data, a reference signal or a cyclic prefix extension.

2. The unlicensed band information transmission method according to claim 1, wherein obtaining, by the terminal, an actual ending position of transmission according to the indication information comprises:

obtaining, by the terminal, an actual ending position of transmission according to the second indicator field in a case that the first indicator field indicates that the actual ending position is not an ending position of the OFDM symbol; or ignoring, by the terminal, the second indicator field in a case that the first indicator field indicates that the actual ending position is an ending position of the OFDM symbol.

3. The unlicensed band information transmission method according to claim 1, wherein in a case that the indication information comprises the first indicator field and the second indicator field, the indication information further comprises:

a third indicator field, used to indicate whether to end timing advance (TA) in advance.

4. The unlicensed band information transmission method according to claim 1, wherein the first offset comprises: 16 µs or 25 µs.

5. The unlicensed band information transmission method according to claim 1, wherein the second offset comprises: 0 µs, 16 µs, 25 µs or a sum of 25 µs and TA.

6. The unlicensed band information transmission method according to claim 1, the OFDM symbol comprises: a last OFDM symbol of time-domain resource allocation, or an M-th OFDM symbol before the ending position of time-domain resource allocation, or an N-th OFDM symbol after the ending position of time-domain resource allocation, wherein M and N are integers greater than or equal to 1.

7. The unlicensed band information transmission method according to claim 1, wherein the indication information is carried in downlink control information (DCI), or the indication information is carried in radio resource control (RRC) signaling.

8. A terminal, comprising a processor, a memory, and a program that is stored in the memory and executable on the processor, wherein the program, when executed by the processor, cause the terminal to perform:

receiving indication information; and obtaining an actual ending position of transmission according to the indication information, wherein the actual ending position is located at an ending position of an orthogonal frequency division multiple (OFDM) symbol, or the actual ending position is located inside the OFDM symbol; wherein the indication information comprises a first indicator field and a second indicator field, the first indicator field is used to indicate whether the actual ending position is an ending position or inside of the OFDM symbol, and the second indicator field is used to indicate a first offset between the actual ending position and the ending position of the OFDM symbol; or the indication information comprises a fourth indicator field used to indicate a second offset between the actual ending position and the ending position of the OFDM symbol;

wherein the program, when executed by the processor, cause the terminal to further perform;

sending preset information in a time-domain resource before the actual ending position in the OFDM symbol, wherein the preset information comprises at least one of a reservation signal, data, a reference signal or a cyclic prefix extension.

9. The terminal according to claim 8, wherein the program, when executed by the processor, cause the processor to perform:

obtaining an actual ending position of transmission according to the second indicator field in a case that the first indicator field indicates that the actual ending position is not an ending position of the OFDM symbol; or ignoring the second indicator field in a case that the first indicator field indicates that the actual ending position is an ending position of the OFDM symbol.

10. The terminal according to claim 8, wherein in a case that the indication information comprises the first indicator field and the second indicator field, the indication information further comprises:

a third indicator field, used to indicate whether to end timing advance in advance.

11. The terminal according to claim 8, the OFDM symbol comprises: a last OFDM symbol of time-domain resource allocation, or an M-th OFDM symbol before the ending position of time-domain resource allocation, or an N-th OFDM symbol after the ending position of time-domain resource allocation, wherein M and N are integers greater than or equal to 1.

12. The terminal according to claim 8, wherein the first offset comprises: 16 µs or 25 µs.

13. The terminal according to claim 8, wherein the second offset comprises: 0 µs, 16 µs, 25 µs or a sum of 25 µs and TA.

14. The terminal according to claim 8, wherein the indication information is carried in downlink control information (DCI), or the indication information is carried in radio resource control (RRC) signaling.

15. A network device, comprising a processor, a memory, and a program that is stored in the memory and executable on the processor, wherein the program, when executed by the processor, cause the network device to perform:

sending indication information to a terminal, wherein the indication information is used to indicate an actual ending position of transmission, and the actual ending position is located at an ending position of an orthogonal frequency division multiple (OFDM) symbol, or the actual ending position is located inside the OFDM symbol; wherein the indication information comprises a first indicator field and a second indicator field, the first indicator field is used to indicate whether the actual ending position is an ending position or inside of the OFDM symbol, and the second indicator field is used to indicate a first offset between the actual ending position and the ending position of the OFDM symbol; or the indication information comprises a fourth indicator field used to indicate a second offset between the actual ending position and the ending position of the OFDM symbol;

wherein the program, when executed by the processor, causes the network device to perform further perform;

sending preset information in a time-domain resource before the actual ending position in the OFDM symbol, wherein the preset information comprises at least one of a reservation signal, data, a reference signal or a cyclic prefix extension.

16. The network device according to claim 15, wherein in a case that the indication information comprises the first indicator field and the second indicator field, the indication information further comprises:

a third indicator field, used to indicate whether to end timing advance in advance.

17. The network device according to claim 15, wherein the first offset comprises: 16 μs or 25 μs.

18. The network device according to claim 15, wherein the second offset comprises: 0 μs, 16 μs, 25 μs or a sum of 25 μs and TA.

19. The network device according to claim 15, the OFDM symbol comprises: a last OFDM symbol of time-domain resource allocation, or an M-th OFDM symbol before the ending position of time-domain resource allocation, or an N-th OFDM symbol after the ending position of time-domain resource allocation, wherein M and N are integers greater than or equal to 1.

20. The network device according to claim 15, wherein the indication information is carried in downlink control information (DCI), or the indication information is carried in radio resource control (RRC) signaling.

\* \* \* \* \*